(12) United States Patent
El-Batal et al.

(10) Patent No.: US 9,021,141 B2
(45) Date of Patent: Apr. 28, 2015

(54) DATA STORAGE CONTROLLER AND METHOD FOR EXPOSING INFORMATION STORED IN A DATA STORAGE CONTROLLER TO A HOST SYSTEM

(71) Applicant: LSI Corporation, San Jose, CA (US)

(72) Inventors: Mohamad El-Batal, Westminster, CO (US); Anant Baderdinni, Lawrenceville, GA (US); Mark Ish, Sandy Springs, GA (US); Jason M. Stuhlsatz, Dacula, GA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/103,679

(22) Filed: Dec. 11, 2013

(65) Prior Publication Data

US 2015/0058533 A1 Feb. 26, 2015

Related U.S. Application Data

(60) Provisional application No. 61/867,632, filed on Aug. 20, 2013.

(51) Int. Cl.
*G06F 13/38* (2006.01)
*G06F 12/02* (2006.01)
*G06F 3/06* (2006.01)

(52) U.S. Cl.
CPC .......... *G06F 12/0246* (2013.01); *G06F 13/385* (2013.01)

(58) Field of Classification Search
None
See application file for complete search history.

(56) References Cited

U.S. PATENT DOCUMENTS

| 8,074,112 | B1 | 12/2011 | Chang et al. | |
|---|---|---|---|---|
| 8,190,822 | B2 | 5/2012 | Iida et al. | |
| 8,271,737 | B2 | 9/2012 | Chen et al. | |
| 8,347,041 | B2 | 1/2013 | Banerjee | |
| 2007/0276996 | A1 | 11/2007 | Caulkins et al. | |
| 2008/0320214 | A1 | 12/2008 | Ma et al. | |
| 2011/0010582 | A1 | 1/2011 | Tsukamoto et al. | |
| 2014/0129753 | A1* | 5/2014 | Schuette et al. | .............. 710/301 |

FOREIGN PATENT DOCUMENTS

WO WO2010006301 A1 1/2010

* cited by examiner

*Primary Examiner* — Scott Sun
(74) *Attorney, Agent, or Firm* — Robert A. Blaha; Smith Risley Tempel Santos LLC (57) ABSTRACT

A data storage controller exposes information stored in a locally managed volatile memory store to a host system. The locally managed volatile memory store is mapped to a corresponding portion of a peripheral component interconnect express (PCIe) compliant memory space managed by the host system. Backup logic in the data storage controller responds to a power event detected at the interface between the data storage controller and the host system by copying the contents of the volatile memory store to a non-volatile memory store on the data storage controller. Restore logic restores a data storage controller state by copying the contents of the non-volatile memory store to the locally managed volatile memory store upon the application of power such that the data in the volatile memory store is persistent even in the event of a loss of power to the host system and or the data storage controller.

20 Claims, 7 Drawing Sheets

DATA STORAGE CONTROLLER AND METHOD FOR EXPOSING INFORMATION STORED IN A DATA STORAGE CONTROLLER TO A HOST SYSTEM

CROSS-REFERENCE TO RELATED APPLICATIONS

This patent application claims priority under 35 U.S.C. §119(e) to U.S. Provisional Patent Application Ser. No. 61/867,632, filed on Aug. 20, 2013, entitled, "Method for Creating Extreme Low-Latency to Large-Capacity Non-Volatile Memory Within a Standard Server," the entire contents of which are hereby incorporated by reference.

TECHNICAL FIELD

The invention relates generally to server computers that use data storage controller and, more specifically, to data storage controller employing a volatile memory element coupled to server.

BACKGROUND

A typical data storage system includes one or more arrays of magnetic disk drives or similar non-volatile storage devices, and a controller that controls the manner and locations in which data is written to and read from the devices. It is important that a host system be able to reliably access all of the data in the data storage system. However, a potential problem that affects data storage systems is that one or more of the devices and or a controller that manages data transfers to the various storage devices can fail or malfunction in a manner that prevents data from being persistently stored.

Most server computers provide low input/output latency memory storage in volatile memory elements using various dynamic random access memory or DRAM technologies. However, persistent data is required to quickly recover from a power event such as a loss of power. Some have taken the approach of deploying uninterruptable power supplies to ensure data stored in dynamic random access memory elements survives loss of power events. Some others add to the storage requirements and expense associated with providing and maintaining uninterruptable power supplies by introducing power generators which rely on fuel. These approaches fail to address data loss which occurs when a loss of power is encountered.

SUMMARY

Embodiments of a data storage controller and method for exposing information stored in a data storage controller to a host system such that the data is persistent even in the event of a loss of power to the server and or the data storage controller. In an example embodiment, a RAID on chip based storage controller is arranged to expose part of a volatile local memory store as addressable memory to a host system. The volatile local memory store is mapped to a corresponding portion of a peripheral component interconnect express (PCIe) compliant memory space managed by the host system. Thus, the volatile local memory is accessible to the host system via processor load/store commands, a direct memory access (DMA) channel or a remote DMA channel.

In an exemplary embodiment, a data storage controller includes an interface, an integrated storage manager, a non-volatile memory and a volatile memory. The interface provides power and data signals to the data storage controller from the host system. The integrated storage manager is coupled to the interface, the non-volatile memory and the volatile memory. The integrated storage manager exposes a local memory space, supported by the volatile memory, to a peripheral component interconnect express (PCIe) compliant memory space managed by the host system. The integrated storage manager communicates a base address register and a storage capacity to the host system.

A method for generating a low-latency non-volatile memory store usable by a host system from a volatile memory store in a data storage controller, includes the steps of defining a region of a volatile memory store managed by the data storage controller for exposure to the host system, associating a respective region of a peripheral component interconnect express compliant memory space managed by the host system to the region of the volatile memory store managed by the data storage controller and providing backup logic that directs the data storage controller to copy the content in the region of the volatile memory store to a non-volatile memory store coupled to the storage controller upon detection of a power event at an interface between the host system and the data storage controller.

DETAILED DESCRIPTION OF ILLUSTRATIVE EMBODIMENTS

In an example embodiment, a RAID on chip based storage controller is arranged to expose part of a volatile local memory store as addressable memory to a host system. The volatile local memory store is mapped to a corresponding portion of a peripheral component interconnect express (PCIe) compliant memory space managed by the host system. Thus, the volatile local memory is accessible to the host system via processor load/store commands, a direct memory access (DMA) channel or a remote DMA channel.

A data storage controller exposes information stored in a locally managed volatile memory store or memory space to a host system such as a server computer. The locally managed volatile memory store from the perspective of the data storage controller is mapped or exposed to a corresponding portion of a peripheral component interconnect express (PCIe) compliant memory space managed by the host system. Backup logic in the data storage controller responds to a power event detected at the interface between the data storage controller and the host system by copying the contents of the volatile memory store to a non-volatile memory store on the data storage controller. Restore logic restores a data storage controller state by copying the contents of the non-volatile memory store to the locally managed volatile memory store upon the application of power such that the data in the volatile memory store is persistent even in the event of a loss of power to the host system and or the data storage controller.

Figure 1:
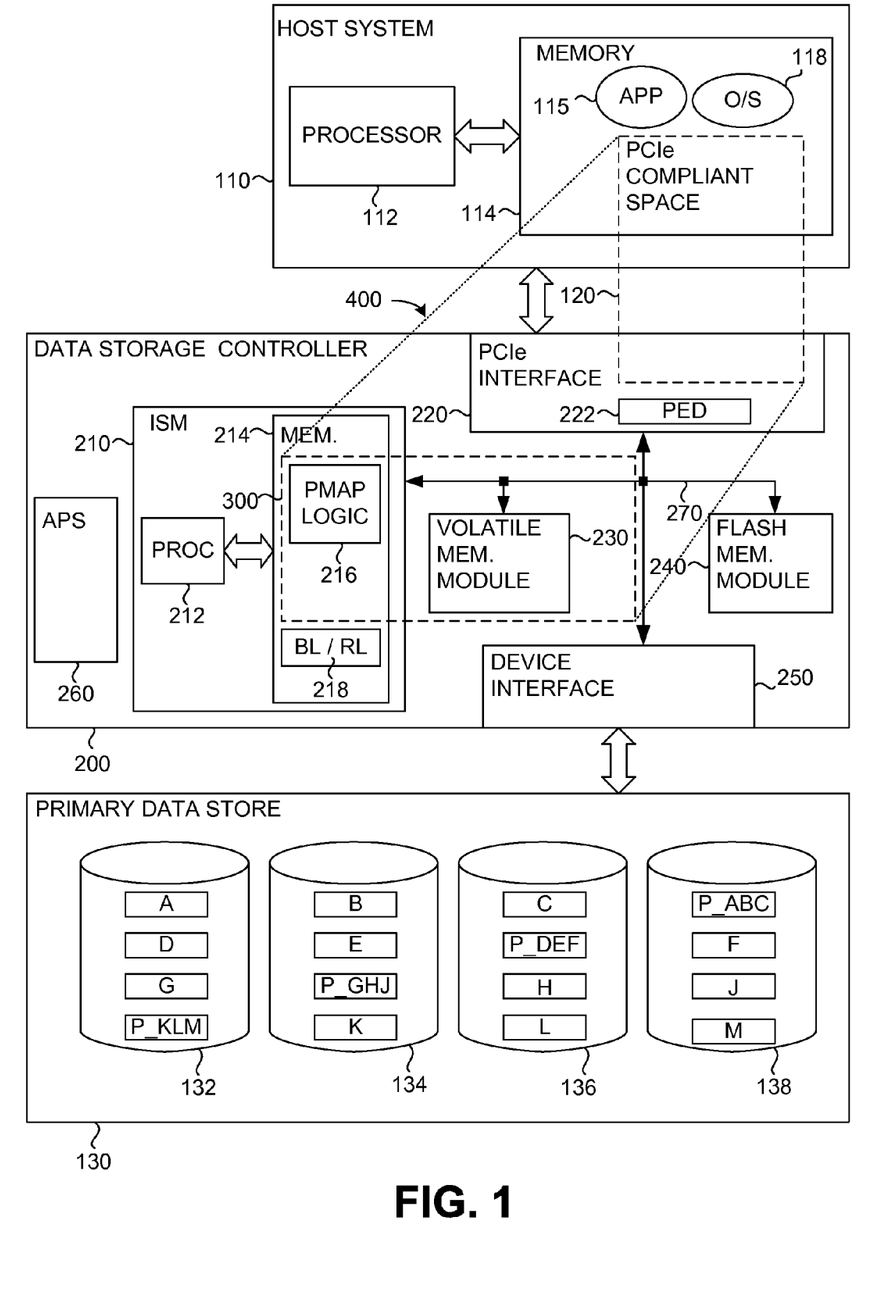
FIG. 1 is a schematic illustration of a data storage controller in an environment with a host system and a storage array.

Attention is now directed to the illustrated embodiments of the improved data storage controller 200 as shown in FIGS. 1-8. FIG. 1 is a schematic illustration of a data storage controller 200 in a computing environment with a host system 110 and a primary data store 130. The host system 110 includes a processor 112 coupled to a memory 114. The processor 112 is a hardware element for executing software such as application or APP 115 stored in the memory 114. A peripheral component interconnect express (PCIe) compliant memory space, illustrated with a dashed line, is supported by an operating system or O/S 118 stored in the memory 114 and executed by the processor 112. Information from the APP 115 is controllably transferred via a communication bus depicted by a two way arrow that connects the host system 110 to the data storage controller 200. In addition, information from the data storage controller 200 is controllably transferred or communicated via the communication bus. In this way, data may be transferred to and or from the data storage controller 200.

The data storage controller 200 is arranged with a PCIe interface 220, a storage device interface 250, an integrated storage manager or ISM 210, a volatile memory module 230, a flash or non-volatile memory module 240 and an alternative power supply APS 260. As indicated in FIG. 1, each of the ISM 210, the PCIe interface 220, the device interface 250, the volatile memory module 230 and the flash memory module 240 are connected to each other via a communication bus 270 arranged for communicating data between the host system 110 and the primary data store 130. As further shown in FIG. 1, the PCIe interface 220 is arranged with a power event detector or PED 222. The PED 222 is arranged to identify one or more types of adverse power conditions such as a loss of power signal or a low-voltage signal and/or noise on a power line. In response to one or more of these or other power event conditions present in the PCIe interface 220, the PED 222 generates a corresponding signal, which is communicated to the backup logic portion of the backup restore logic 218 stored in the ISM 210.

The ISM 210 is arranged with a processor 212 and an integrated memory 214 for controlling data transfers between the host system 110 and the primary data store 130. In the illustrated embodiment, the ISM 210 is arranged to buffer blocks or data segments until such time that it is convenient to direct the storage elements 132 through 138 to arrange or distribute the information across the storage devices 132 through 138. In the example embodiment, each row of N−1 blocks or N−1 data elements is protected by an $N^{th}$ parity block or parity segment derived from a logical function of the N−1 blocks in the corresponding row of the array of storage elements. In the illustrated array the parity blocks are also shifted or distributed across the data storage elements supporting the primary data store 130.

While the illustrated embodiment includes 4 data storage elements, it should be understood that any desired number of data storage elements of three or more devices can be arranged in an array where a row of storage elements or blocks is recoverable from a failure of one of the separate storage elements supporting the primary data store 130.

An ISM managed local memory space 300 is supported by a portion of the storage capacity provided by the integrated memory 214 and the volatile memory module 230. The integrated memory 214 includes programmable map logic or PMAP logic 216, as well as backup and restore logic 218. Additional data storage capacity suitable for storing the contents of the local memory space 300 is provided by the flash memory module 240. As further indicated by the fine dashed line, a mapping scheme 400 exposes the local memory space 300 to the PCIe compliant memory space 120.

Figure 2:
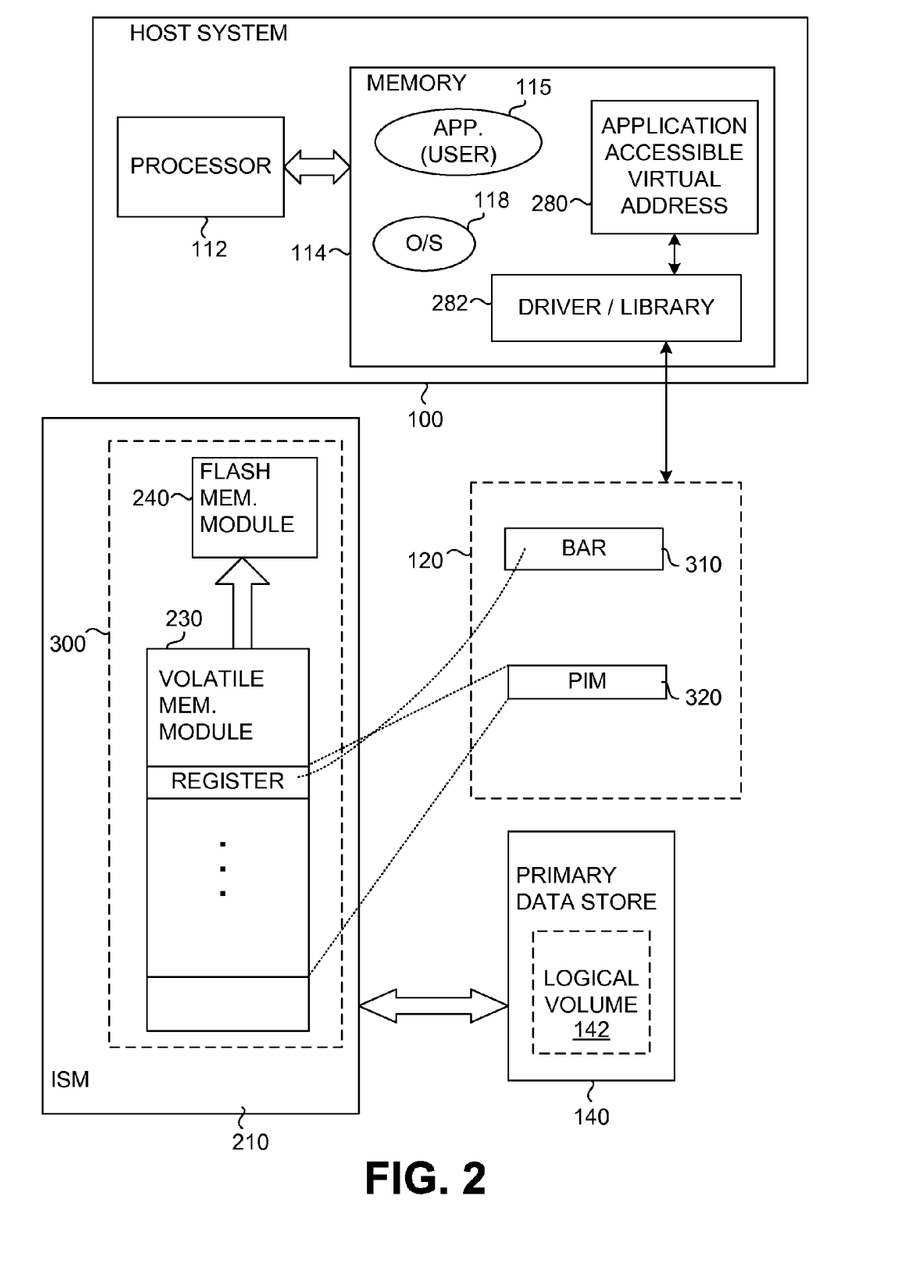
FIG. 2 is a schematic illustration of a block diagram illustrating exposure of a local memory space to a PCIe compliant memory space in the environment of FIG. 1.

FIG. 2 is a schematic illustration of a block diagram illustrating a mechanism for exposing the local memory space 300 to the PCIe compliant memory space 120 in the computing and data storage environment introduced in FIG. 1. As illustrated in FIG. 2, host system 100 includes processor 112 and memory 114. The memory 114 stores one or both of a driver or library 282, which when executed by the processor 112, provide an application accessible virtual address 280 to an O/S 118 and or applications such as APP 115 executing in the host system 100. The application accessible virtual address is derived from information retrieved from the PCIe compliant memory space 120 as determined as a function of the base address register 310 and the programmable inbound map or PIM 320.

As further shown by way of the finely dashed lines, the PIM 320 defines a series of addressable storage registers or locations in the volatile memory module 230. This definition of a region or area of the volatile memory module of the local memory space 300 includes communicating a base address register and a storage capacity to the host system 100 upon a power-on initialization of the data storage controller 200.

In the example embodiment illustrated in FIG. 2, the local memory space 300 encompasses the entirety of the storage capacity provided by the integrated memory 214, the volatile memory module 230 and the non-volatile memory module 240. It should be understood that one or more regions or portions of the storage capacity of one or more of these storage elements may be segmented or segregated from the local memory space 300 as may be desired.

Figure 3:
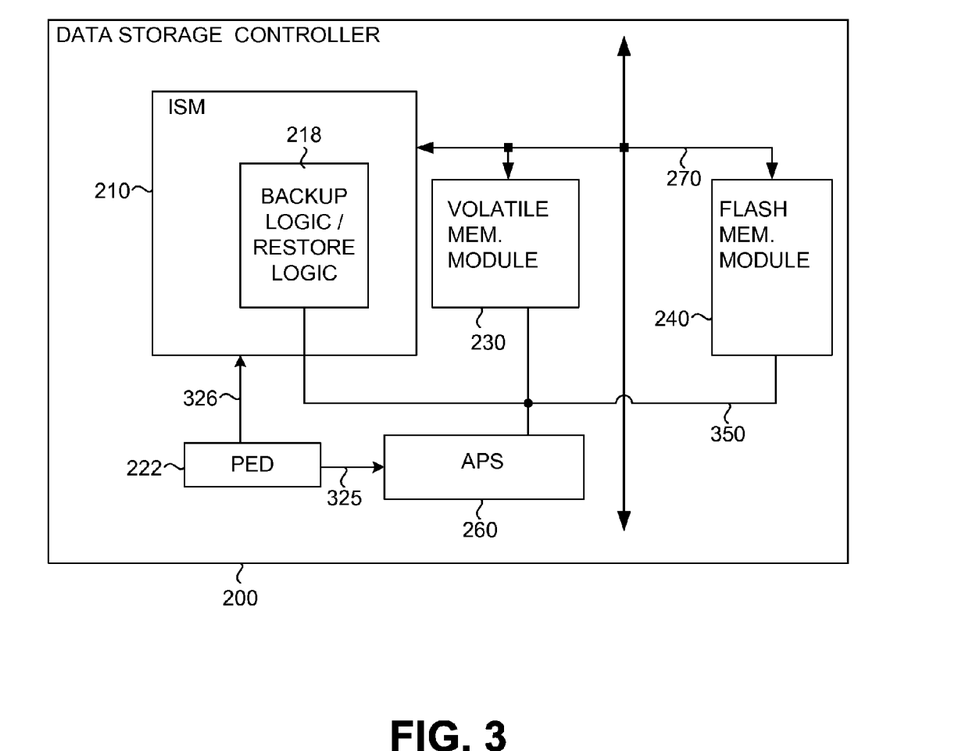
FIG. 3 is a schematic illustration of a sub-system for detecting and responding to power events in the data storage controller of FIG. 1.

FIG. 3 is a schematic illustration of a sub-system for detecting and responding to power events in the data storage controller 200 of FIG. 1. For simplicity of illustration and description only related elements of the sub-system for detecting and responding to power events are shown. As illustrated, a power event detector (PED) 222 forwards an indication of a complete loss of power, a low supply voltage or a noisy supply voltage or some other power event on connection 325 to an alternative power supply 260. The PED 222 also signals the ISM 210 on connection 326 to notify the ISM 210 that a power event has been detected. In response, the ISM 210 may interrupt or complete other operations in progress on the data storage controller 200 before initializing and executing processor instructions in the backup logic/restore logic module 218.

The alternative power supply 260 can be an energy storage device integrated on the data storage controller 200 or may be a switch or switches that provide power from a secondary power source via power distribution network 350. Thus, the APS 260 may be a capacitor, a battery, a rechargeable battery or a set of one type, two types, or all types of these energy storage devices. In embodiments where the APS 260 is a switch or a set of switches, the APS 260 will be coupled to an external power source such as an uninterruptible power supply or a power generator that is capable of providing sufficient energy to the data storage controller 200 during a power event on the host system 110 or at the interface between the host system 110 and the data storage controller 200 to permit the ISM 210 to operate the backup logic portion of the backup restore module 218 to manage or direct a transfer of data stored in the volatile memory module 230 to the flash memory module 240.

In preferred embodiments, the entire contents of the volatile memory module 230 are transferred or copied to the non-volatile or flash memory module 240. In alternative embodiments, one or more select regions of the storage capacity of the volatile memory module 214 upon restoration of power or recovery from the power event condition, may be refreshed or restored with information from a source (not shown) other than the flash memory module 240. Stated another way, the data storage controller 200 may be arranged with more than one flash memory module 240.

As shown, the ISM 210, the volatile memory module 230 and the flash memory module 240 are coupled to the alternative power supply or APS 260 via the power distribution network 350. When needed or used in the data storage controller architecture, elements supporting the communication bus 270 such as buffers or registers will also be provided energy from the APS 260 via the power distribution network 350.

Figure 4:
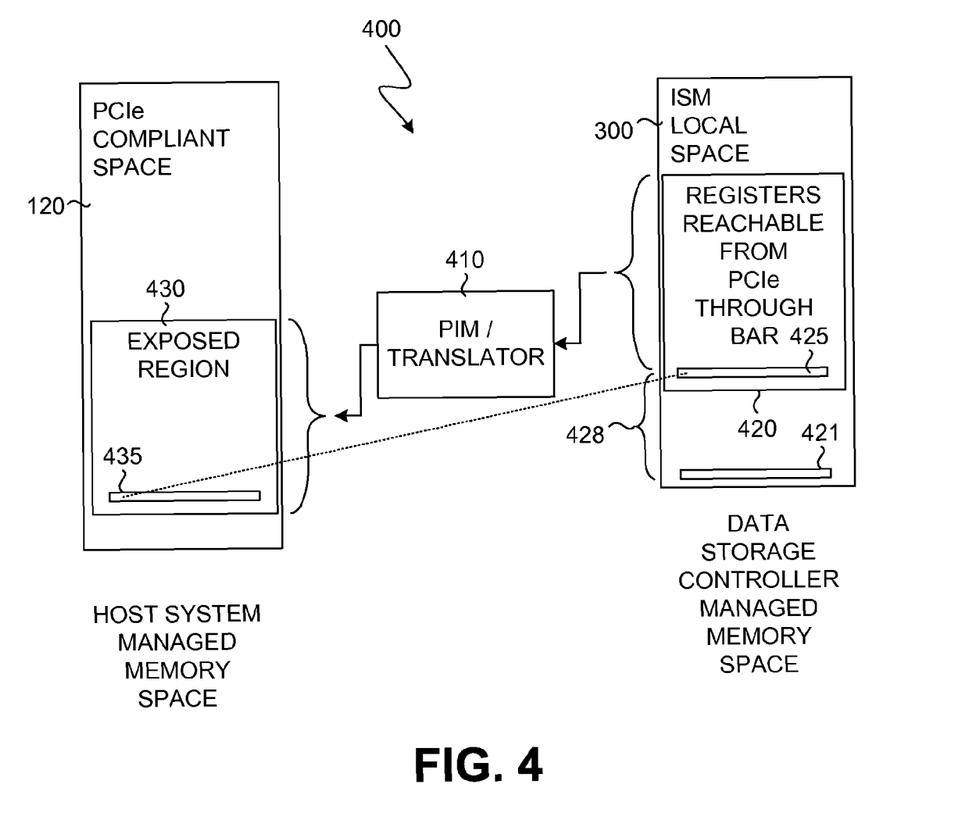
FIG. 4 is a schematic illustration of a programmable memory map of FIG. 1.

FIG. 4 is a schematic illustration of an embodiment of the programmable memory map 400 introduced in the computing environment of FIG. 1. As illustrated, the programmable memory map 400 defines a translation of addressable registers in the ISM controlled local memory space 300 to the host controlled PCIe compliant memory space 120. A programmable inbound map (PIM) or translator 410 connects a region or subset of addressable registers 420 of the local memory space 320 with a respective exposed region or subset of the addressable registers available in the PCIe memory space 120. The location of the addressable registers in the region 420 is defined by a base address register or BAR 421 and the distance or offset 428 in registers between the BAR 421 and the first addressable register 425 in the region 420. As indicated by the dashed line the first addressable register 420 in the region 420 of the local memory space 300 is associated in a one-to-one relationship with a corresponding first register 435 in the exposed region 430 of the PCIe compliant memory space 120. The PIM/translator 410 maintains the one-to one relationship between corresponding registers from the region 420 and the region 430. When the PIM/translator 410 is not enabled in hardware such as a dedicated integrated, the PIM/translator 410 may be enabled in software such as the programmable map logic 216 introduced in FIG. 1.

Although the illustrated embodiment shows respective regions in each of the local memory space 300 and the PCIe memory space 102. It should be understood that similar one-to-one relationships can be established for additional regions of these memory spaces as long as capacity permits. In this way, the ISM 210 operating in the data storage controller 200 exposes volatile physical address space managed by the data storage controller 200 through one or more base address registers and an offset. As explained, a driver or library operative in the host system 110 can further map the addressable registers in the exposed region 430 through the use of virtual addresses to one or more applications such as application 115 operating in the host system 110.

Figure 5:
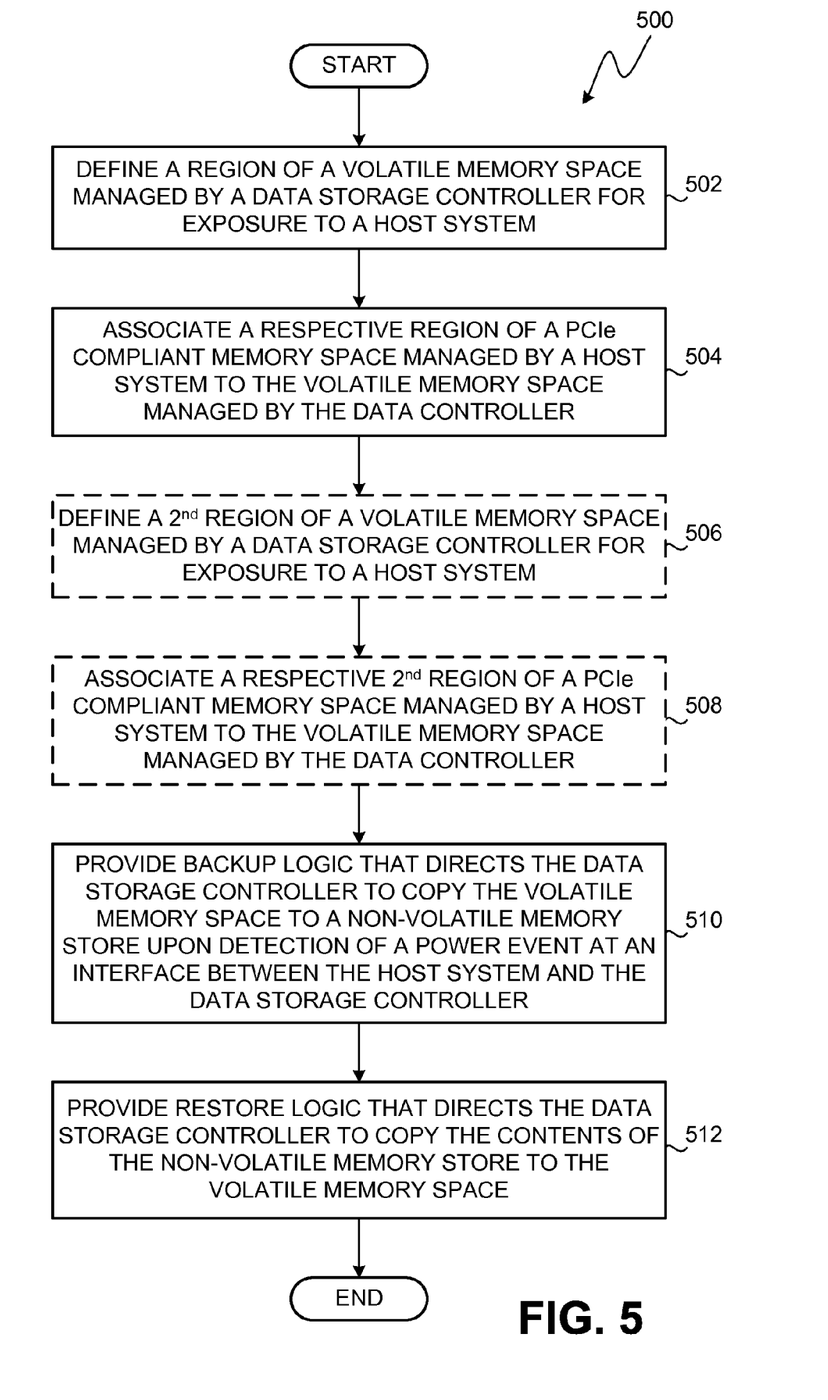
FIG. 5 is a flow diagram of an embodiment of a method for exposing information stored in a data storage controller to a host system.

FIG. 5 is a flow diagram of an embodiment of a method 500 for exposing information stored in a data storage controller 200 to a host system 110. As illustrated, the method 500 begins with block 502 where a region of a volatile memory space 300 managed by a data storage controller 200 is defined for later exposure to a host system 110. In block 504, a respective region of a PCIe compliant memory space 120 (managed by the host system 110) is associated with the volatile memory space 300 (managed by the data storage controller 200). As described, the association is a point-to-point or addressable location to addressable location relationship between the region of the volatile memory space 300 and the respective region in the PCIe compliant memory space. As shown in dashed lines the functions illustrated in blocks 506 and 508 are optional and include defining a second region of the volatile memory space 300 for exposure to the host system 110 as shown in block 506 and associating a respective second region of the PCIe compliant memory space 120 to the second region of the volatile memory space 300, as shown in block 508. Those skilled in the art will understand that the method 500 for exposing information in this manner may be further expanded to include additional regions mapped in a one-to-one relationship with one another when storage capacity exists.

In block 510, backup logic is provided. The backup logic directs the data storage controller to copy the contents of the volatile local memory space 300 (e.g., as stored in the volatile memory module 230) to a non-volatile memory store (e.g., the flash memory module 240) upon detection of a power event at the interface between the data storage controller 200 and the host system 110. In block 512, restore logic is provided. The restore logic directs the data storage controller 200 to copy the contents of the non-volatile memory (e.g., flash memory module 240) to the volatile memory module 230. As described, the restore logic may be applied upon receipt of an indication of the completion of a power-on initialization in conjunction with a flag or other signal that instructs the data storage controller that it has recovered from a power event and a successful completion of a backup procedure where such successful completion results in a persistent copy of the memory space of the data storage controller being placed in the flash memory module 230.

Those skilled in the art will understand that the power event detection may be performed at alternative locations in the host system 110 and the data storage controller 200 depending on the power sources coupled to each of these elements. For example, if the host system 110 supplies primary power to the data storage controller 200 via the PCIe interface 220, a power event detector 222 is all that might be necessary to identify power events that could compromise the integrity of the information in the local memory space 300. Even so, the host system 110 and/or the data storage controller 200 may include additional detectors (not shown) to identify when local power events could compromise the information in the local memory space 300.

For example, an uninterruptible power supply coupled to the host system may provide a signal when AC supply voltage falls below a threshold value. By way of further example, a detector or detectors associated with the alternative power supply 260 may provide a signal when the energy available in the alternative power supply would be incapable of supporting the data bus 270, the ISM 210, the volatile memory module 230 and the flash memory module 240 for the time necessary to store the present state of the local memory 300. Under these circumstances, the data storage controller 200 may provide a warning signal to the host system 110 and may initialize a timer that upon expiration directs the ISM 210 to execute the backup logic to transfer or refresh the contents of the flash memory module 240 with the contents in the volatile memory module 230. The timer may be restarted until such time that the alternative power supply or the data storage controller 200 are serviced.

Under some circumstances, an additional signal may include a representation of an estimate of time that the uninterruptible power supply will be capable of supplying the necessary electrical energy for the host system 110, the data storage controller 200 and any other active peripheral devices at present load conditions. The data storage controller 200 may use this estimate of time remaining to verify the integrity of an alternative power supply and or to move data to the primary data store until it becomes critical to move the local memory space to the flash memory module 240 using the described features and methods.

Figure 6:
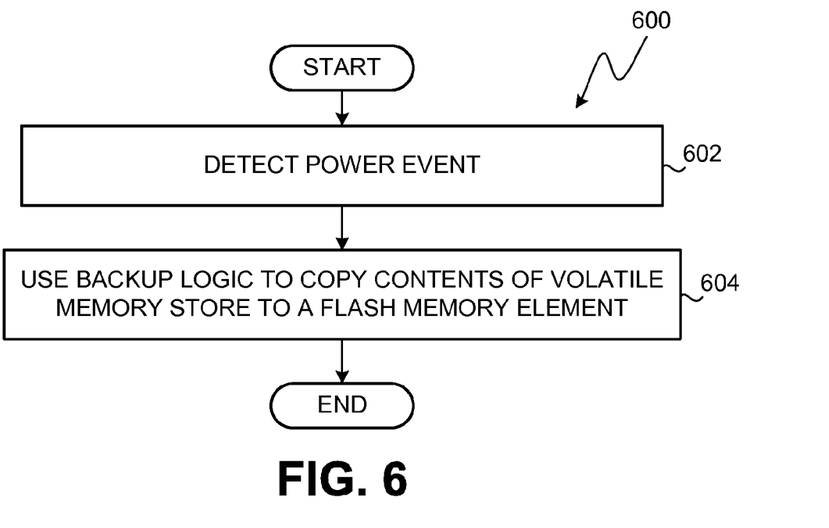
FIG. 6 is a flow diagram of an embodiment of a method for persistently protecting volatile data in a data storage controller.

FIG. 6 is a flow diagram of an embodiment of a method 600 for backing-up or making persistent the information stored in a local memory space 300 in a data storage controller 200. The method 600 begins with block 602 where the data storage controller 200, or the host system 110, detect a power event. As described, the power event may be a loss of AC power (when the data storage controller 200 relies on the host system 1100 for power) or DC power at the interface between the host system 110 and the data storage controller 200. As indicated in block 604 the contents of the volatile memory module 230 are copied to the flash memory module 240.

As described, an uninterruptible power supply, a capacitor, a battery or a combination of one or more of these electrical energy storage elements may be arranged to power the bus 270, processor 212 backup logic/restore logic 218, the volatile memory module 230 and the flash memory module 240 until such time that the contents of the local memory space 300 have been successfully transferred to the flash storage module 240. Thereafter, the local memory space 300 is available once power is restored to the data storage controller 200.

Figure 7:
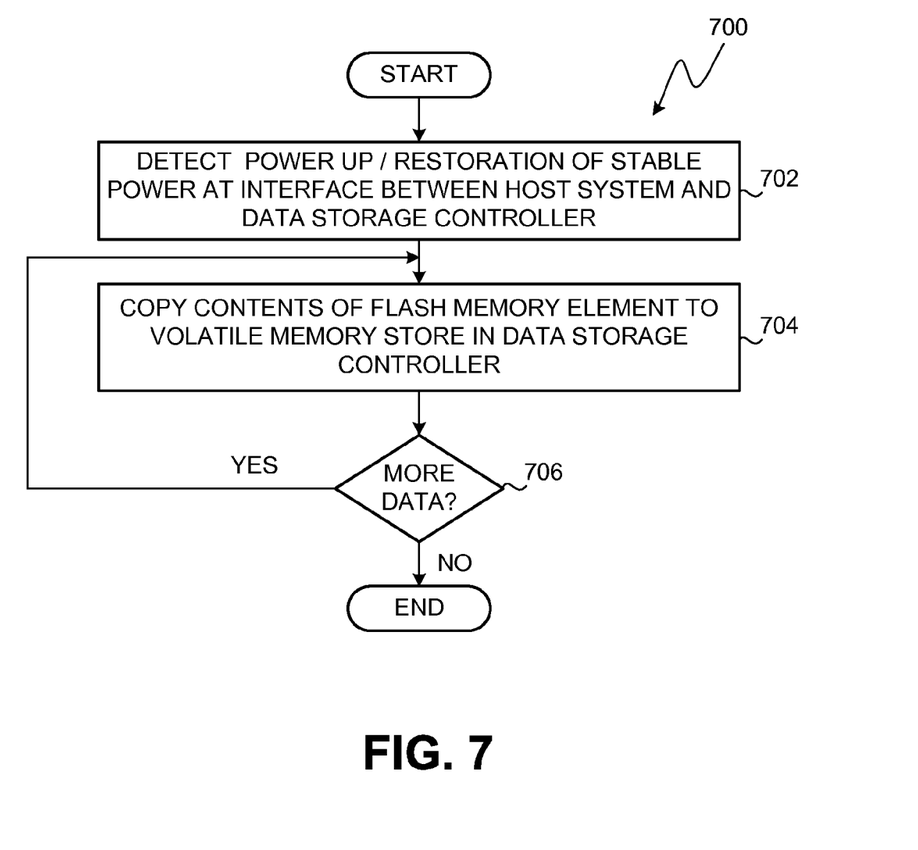
FIG. 7 is a flow diagram of an embodiment of a method for recovering from a power event.

FIG. 7 is a flow diagram of an embodiment of a method 700 for restoring a local memory space 300 in a data storage controller 200. The method 700 begins with block 702 where the data storage controller 200 or the host system 110 detect either the completion of a power-up operation after a loss of primary power and a subsequent backup operation of the contents in the volatile memory module 230 or the restoration of stable power at the PCIe interface 220 between the host system 110 and the data storage controller 200. Thereafter, as indicated in block 704 the contents of the flash memory module 240 are copied to the volatile memory module 230 in the data storage controller 200. In block 706 it is determined whether the copy operation is complete. When data remains to be copied or restored to the volatile memory module 230 from the flash memory module 240, processing returns to repeat the functions shown in blocks 704 and 706. It should be understood that the functionality associated with block 704 and/or the arrow exiting decision block 706 will include either a block copy instruction, or a counter to cycle through the addressable storage locations defined in the flash memory module 240. Otherwise, when all data has been processed, the method 700 for restoring the local memory space 300 in the data storage controller 200 terminates.

Figure 8:
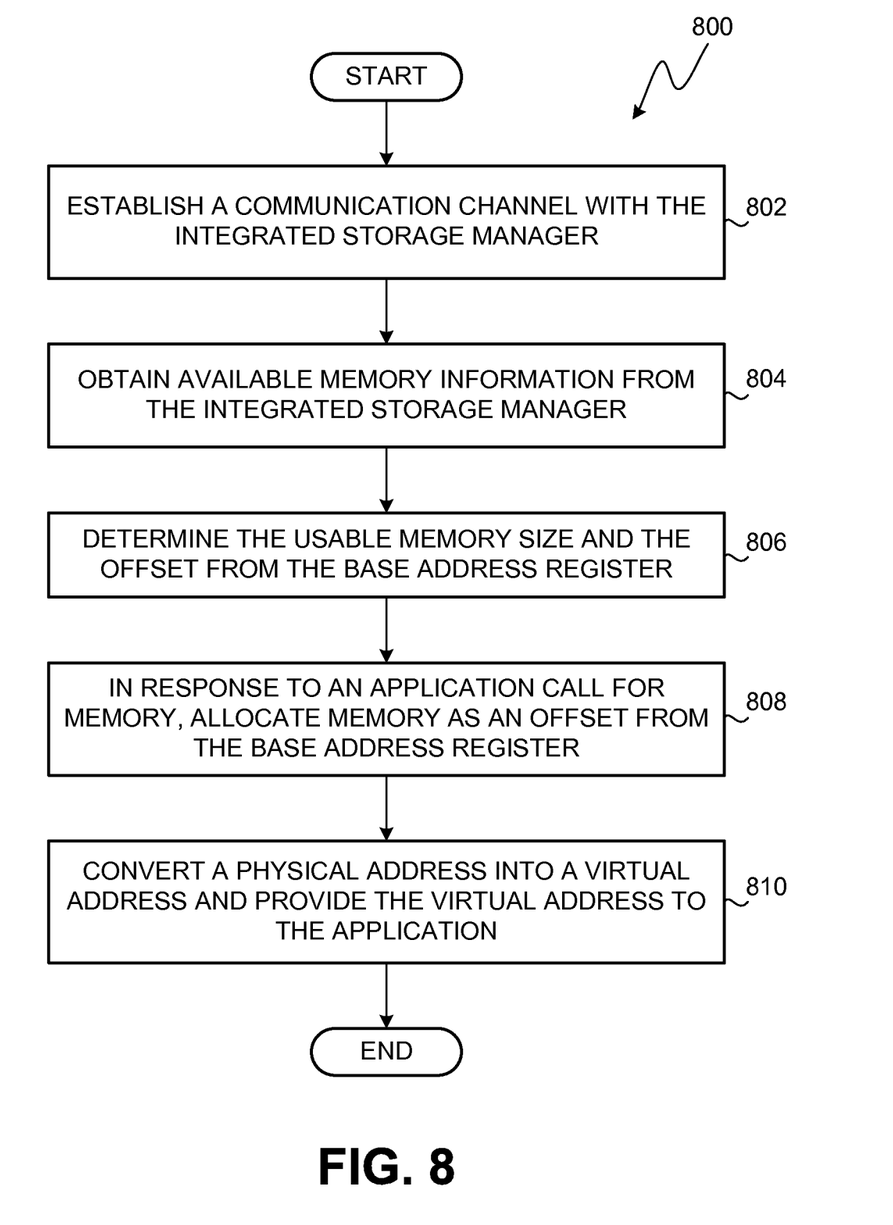
FIG. 8 is a flow diagram of an embodiment of a method for exposing memory managed by a data storage controller to an application executing in a host system.

FIG. 8 includes a flow diagram of an embodiment of a method 800 for exposing memory managed by a data storage controller 200 to an application 115 executing in a host system 110. Method 800 begins with block 802 where the application 115 or an operating system (not shown) operative in the host system 110 establish a communication channel with the integrated storage manager (ISM) 210 of the data storage controller 200. As described, the communication channel is enabled via the PCIe interface 220. In block 804, the application 115 or the operating system (not shown) obtain information from the ISM 210 regarding the available memory space on the data storage controller 200 for use by the application 115. In block 806, a driver or a library operative on the host system 110 determines the available storage capacity and an offset from a base address register 421 in the local memory space 300. As indicated in block 808, in response to an application or operating system call for memory, the driver or library operative on the host system 110 allocates memory as desired and as available as an offset determined from the base address register 421. As further indicated in block 810, the driver or library operative on the host system 110 converts a physical address in the data storage controller managed memory space to a virtual address. In turn, the driver or library provides the virtual address to the application 115 or the operating system on the host system 110.

The flow diagrams of FIG. 5 through FIG. 8 are exemplary or illustrative of the logic or functionality associated with the described method. Persons skilled in the art will understand that in various embodiments, both physical devices (e.g., hardware systems such as application specific integrated circuits (ASICs)) and/or virtual devices (e.g., a virtual storage controller enabled in software) can be arranged or configured in any of various ways to enable the described methods. It should further be appreciated that to support the efficient and rapid transfer of information between DRAM and flash memory devices, a hardware implementation on an ASIC integrated with the data storage controller is considered and may be preferable over a virtual storage controller enabled by a general purpose processor coupled to one or more accessible memory elements for making a copy of volatile information.

In addition, it should be appreciated that the steps or acts described above can occur in any suitable order or sequence, including in parallel or asynchronously with each other. Steps or acts described above with regard to FIG. 5 through FIG. 8 can be combined with others or omitted in some embodiments. Although depicted for purposes of clarity in the form of flow diagrams in FIG. 5 through FIG. 8, the underlying logic can be modularized or otherwise arranged in any suitable manner. Persons skilled in the art will readily be capable of programming or configuring suitable software or suitable logic, such as in the form of an ASIC or similar device or a combination of integrated circuits or devices, to enable the above-described functions to perform the described methods. When the above-described functions are enabled via software, the instructions can be stored in a non-transitory computer-readable medium.

It should be noted that the improved data storage controller and method for exposing information stored in a data storage controller to a host system have been described with reference to one or more exemplary embodiments for the purpose of demonstrating novel principles and concepts. The improved data storage controller and method for exposing information stored in the data storage controller are not limited to these embodiments. As will be understood by persons skilled in the art, in view of the description provided herein, many variations may be made to the embodiments described herein and all such variations are within the scope of the switch and methods for configuring the same as defined in the claims.

What is claimed is:
1. A data storage controller, comprising:
an interface for communicating with a host system, the interface providing power and data signals to the data storage controller from the host system;
an integrated storage manager coupled to the interface;
a non-volatile memory store coupled to the integrated storage manager; and
a volatile memory store coupled to the integrated storage manager, wherein the integrated storage manager exposes a local memory space to a peripheral component interconnect express (PCIe) compliant memory space using a base-address register.

2. The data storage controller of claim 1, wherein the integrated storage manager maintains a point-to-point relationship between a portion of the local memory space and the PCIe compliant memory space.

3. The data storage controller of claim 2, wherein the local memory space is translated with a programmable map to a defined portion of the PCIe compliant memory space.

4. The data storage controller of claim 3, wherein the programmable map is maintained in software operating in the integrated storage manager.

5. The data storage controller of claim 1, further comprising:
   a local power source arranged to provide power to the integrated storage manager, the non-volatile memory store and the volatile memory store when a power event is detected in the first interface.

6. The data storage controller of claim 5, wherein the local power source is a capacitor.

7. The data storage controller of claim 5, wherein the local power source is a battery.

8. The data storage controller of claim 5, wherein upon the power event the information in the local memory space is copied to the non-volatile memory store.

9. The data storage controller of claim 1, wherein the PCIe compliant memory space is mapped to a virtual address managed by the host.

10. The data storage controller of claim 9, wherein the host allocates a portion of the local memory space to an application.

11. The data storage controller of claim 10, wherein the host allocates the portion of the local memory space by converting a physical address as an offset from the base register and provides a corresponding virtual address to the application.

12. A method for generating a low-latency non-volatile memory store usable by a host system from a volatile memory store in a data storage controller, the method comprising:
   defining a region of a volatile memory store managed by the data storage controller for exposure to the host system;
   associating a respective region of a peripheral component interconnect express compliant memory space managed by the host system to the region of the volatile memory store managed by the data storage controller; and
   providing backup logic that directs the data storage controller to copy the content in the region of the volatile memory store to a non-volatile memory store coupled to the storage controller upon detection of a power event at an interface between the host system and the data storage controller.

13. The method of claim 12, wherein defining the region of the volatile memory comprises communicating a base address register and a storage capacity to the host system upon a power-on initialization of the data storage controller.

14. The method of claim 12, wherein associating the respective region of the peripheral component interconnect express memory space includes using a mapping scheme.

15. The method of claim 14, wherein the mapping scheme is a function of the base address register and an offset.

16. The method of claim 15, wherein providing the backup element comprises providing a flash memory element with sufficient capacity to store the content in the volatile memory store.

17. The method of claim 15, wherein providing the backup element comprises providing an alternative power source coupled to the storage controller, the alternative power source storing energy to power the flash memory element, the volatile memory store and an interconnecting bus, for a time sufficient to complete a copy operation from each address in the volatile memory store to the corresponding address in the flash memory element.

18. The method of claim 17, further comprising:
   providing restore logic arranged to direct the storage controller to copy the content in each address of the flash memory element to a corresponding address in the volatile memory store.

19. The method of claim 17, wherein the alternative power source is selected from the group consisting of a capacitor, a battery, and an uninterruptable power supply.

20. The method of claim 12, further comprising:
   defining a second region of the volatile memory store managed by the data storage controller for exposure to the host system; and
   associating a respective second region of the peripheral component interconnect express compliant memory space managed by the host system to the second region of the volatile memory store managed by the data storage controller.

* * * * *